United States Patent [19]

Boer

[11] 4,370,364
[45] Jan. 25, 1983

[54] METHOD FOR LINING PIPE MAINS HAVING BRANCHING DOMESTIC CONNECTION PIPES

[75] Inventor: Hübert Boer, Reken, Fed. Rep. of Germany

[73] Assignee: diga - die gasheizung GmbH, Essen, Fed. Rep. of Germany

[21] Appl. No.: 333,222

[22] Filed: Dec. 21, 1981

[30] Foreign Application Priority Data

Jan. 17, 1981 [DE] Fed. Rep. of Germany ....... 3101409

[51] Int. Cl.$^3$ .......................... B05D 7/22; B05D 3/12
[52] U.S. Cl. .................................... 427/238; 427/239
[58] Field of Search ................................ 427/238, 239

[56] References Cited

U.S. PATENT DOCUMENTS 3,607,361 9/1971 Hight ................................ 427/238

Primary Examiner—James R. Hoffman
Attorney, Agent, or Firm—Martin A. Farber

[57] ABSTRACT

A method for lining main pipes, to which branching domestic connection pipes are connected, with an internal coating of a hardening plastic composition with which the main pipe is spread, comprising introducing from the interior of a house an inflatable bladder with a connected pressure line into an opened domestic connection pipe into a region of its junction with the main pipe, inflating the bladder through the pressure line and closing the domestic connection pipe tightly in pressure-tight manner by the bladder in the region of the junction with the main pipe, spreading the main pipe with plastic composition to form an internal coating therein. A composition plug, being determined in size by the position of the bladder, thereby is forced into the junction of the domestic connection pipe. Then the pressure is removed from the bladder and the bladder with the pressure line is again withdrawn from the domestic connection pipe, and before hardening of the plastic composition, generating in the domestic connection pipe a sudden negative pressure from the house interior of such magnitude that the composition plug located in the junction is sucked into the domestic connection pipe and deformed into a lining in the domestic connection pipe in the region of the junction, which lining uninterruptedly continues the internal coating of the main pipe.

3 Claims, 5 Drawing Figures

METHOD FOR LINING PIPE MAINS HAVING BRANCHING DOMESTIC CONNECTION PIPES

The invention relates to a method for lining pipe mains to which branching domestic connection pipes are connected, with an internal coating of a hardening plastic composition with which the main is spread.

It is known to line pipe mains with an internal coating consisting of a hardening plastic composition. Corrosion-resistant synthetic resin compositions are used preferably for this purpose, for example based on epoxy resin and bitumen. The spreading of the pipe with the plastic composition takes place in a manner in which the requisite quantity of plastic composition is charged into one end of the pipe and then a device ordinarily called a pipeline plug or pig or swipe or plough is pulled through the pipe, which distributes the composition over the circumference and length of the pipe and presses it against the inner wall of the pipe, produces the desired wall thickness of the coating and smooths the surface of the lining. This method is used especially in underground pipe lines, predominantly with steel and cast iron pipes. The method is used especially in public gas supply and also water supply pipe mains, in order to seal off and correct underground defective or leaky pipes corrosion damage, leaky pipe boxes and the like. In this way the necessity is avoided of blocking streets, opening the street surface at high expense, excavating trenches, laying a completely new pipe and then repairing the street surface again. By the spreading of the plastic composition in the pipe, it is even possible to fill already existing holes in the pipe wall and seal them durably.

However in mains with branching pipes, the plastic composition would also be pressed into the openings of the entering pipes by the pipeline pig in the same way, so that large quantities of composition would be lost and the branching pipes would be blocked. Therefore it was possible to exploit the above-mentioned advantages only partially heretofore when the above-described method was used with what are called main pipes which are laid in the street along the houses and branching off from which are large numbers of domestic connection pipes leading into the individual buildings, since with high expenditure of labor and costs it was necessary to open up the street and excavate a trench in front of every house in order to separate the domestic connection pipes from the main pipe, seal off the openings of the entrances tightly against the penetration of plastic composition and after lining the main pipe to reconnect the domestic connection pipes. Still then the trenches had to be refilled and the street surface repaired. On the other hand, however, specifically the threadings and seals of the connection pieces in the regions where the domestic connection pipes join the main pipe are frequently affected by leakages, so that it would be desirable simultaneously with the correction of the main pipe, for the critical points at the junctions, which tend to leak, to be lined and sealed with the plastic composition.

The present invention is based upon the problem of avoiding the above-stated disadvantages and producing a method for lining main pipes, which on the one hand renders it possible, with the simplest conceivable means and minimum expenditure of labor and costs, to eliminate blockage of the entrances of the domestic connection pipes by the plastic composition, without the necessity, for this purpose, to separate the domestic connection pipes from the main pipe and carry out excavation in the street heretofore necessary for this, such that the above-described advantages can be achieved to the full extent without limitation. On the other hand the method is to make it possible to line the above-mentioned critical points at the entrances of the domestic connection pipes, simultaneously with the internal coating of the main pipe.

The solution to this problem in accordance with the invention is effected by introducing from the house interior (12) an inflatable bladder (17) with a connected pressure line (19) into the opened domestic connection pipe (10) into the region of its junction (8) with the main pipe (1), inflating the bladder (17) through the pressure line (19) and closing the domestic connection pipe (10) tightly and in pressure-tight manner by means of the bladder (17) in the region of its junction (8) with the main pipe (1), spreading the main pipe (1) with plastic composition, a composition plug (24) being determined in size by the position of the bladder (17) being forced into the junction (8) of the domestic connection pipe (10), then removing the pressure from the bladder (17) and withdrawing the bladder (17) with the pressure line (19) again from the domestic connection pipe (10), and before the hardening of the plastic composition generating a sudden negative pressure from the house interior (12) in the domestic connection pipe (10) of such magnitude that the composition plug (24) located in the junction (8) is sucked into the domestic connection pipe (10) and thereby deformed into a lining (27) of the domestic connection pipe (10) in the regions of its junction (8) which uninterruptedly continues the internal coating (23) of the main pipe (1).

Further according to the invention the bladder (17) is introduced into the domestic connection pipe (10) until it abuts on the junction (8) with the main pipe (1), and then is withdrawn so far into the domestic connection pipe (10) that the composition plug (24) of predetermined size is formed in the junction (8). Still further according to the invention the generation of the sudden negative pressure in the domestic connection pipe (10) is repeated.

With the above and other objects and advantages in view, the present invention will become more clearly understood in connection with the detailed description of a preferred embodiment, when considered with the accompanying drawings, of which:

Figure 1:
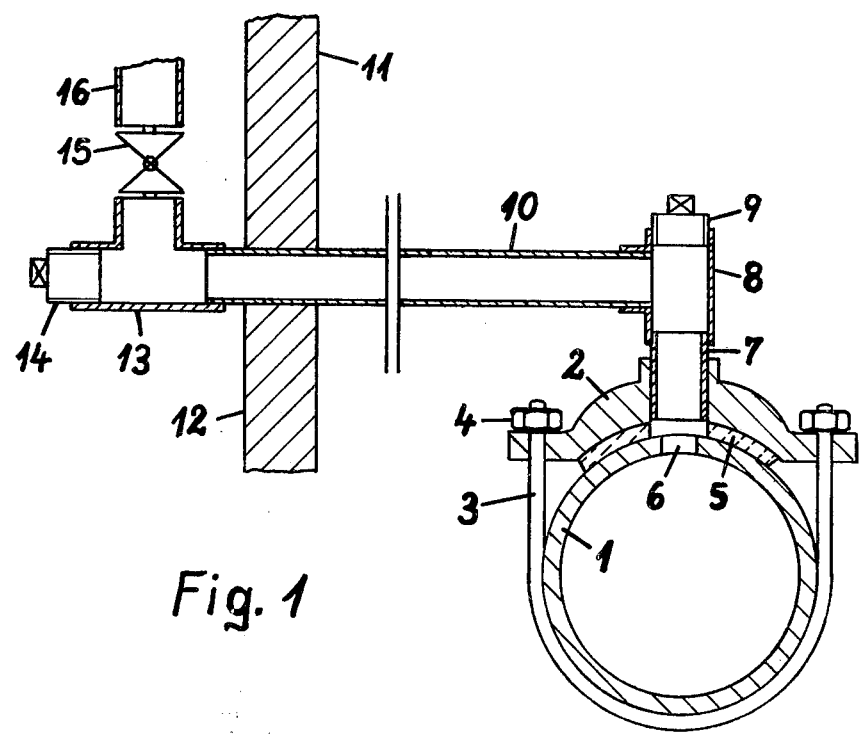
FIG. 1 shows a main gas pipe with a domestic connection pipe, the latter being broken away.

In FIG. 1 a boring pipe box 2 with a gasket or seal 5 is secured on the main gas pipe 1 by means of U-bolts 3 and nuts 4. The main pipe 1, drilled through the box 2, has an opening 6 sealed off around its circumference by the gasket 5. A pipe nipple 7, onto which a T-piece 8 with a screwed-in stopper 9 is screwed, is screwed into the boring pipe box 2 and a domestic connection pipe 10 is connected to the T-piece 8. The gasket 5 and the sealed threadings on the parts 2, 7, 8, 9 and 10 form the above-mentioned critical points where leaks can occur in the course of time. In place of the boring pipe box 2 utilized both for cast iron pipes and for steel pipes, in the case of steel pipes it is also possible to use what is called a saddle T-piece which is welded onto the main pipe 1, through which the main pipe 1 is drilled for the production of the opening 6 and which is provided, as in the example embodiment illustrated, with a stopper 9 and the connected domestic connection pipe 10. The domestic connection pipe 10, conducted through the masonry 11 of the building, is provided as a rule at its end in the interior of the house 12 with a cleaning (clearing) T-piece 13 with a stopper 14, to which there are connected a gas main stop cock 15 and the domestic pipe 16, leading by way of a gas meter further into the building.

Figure 2:
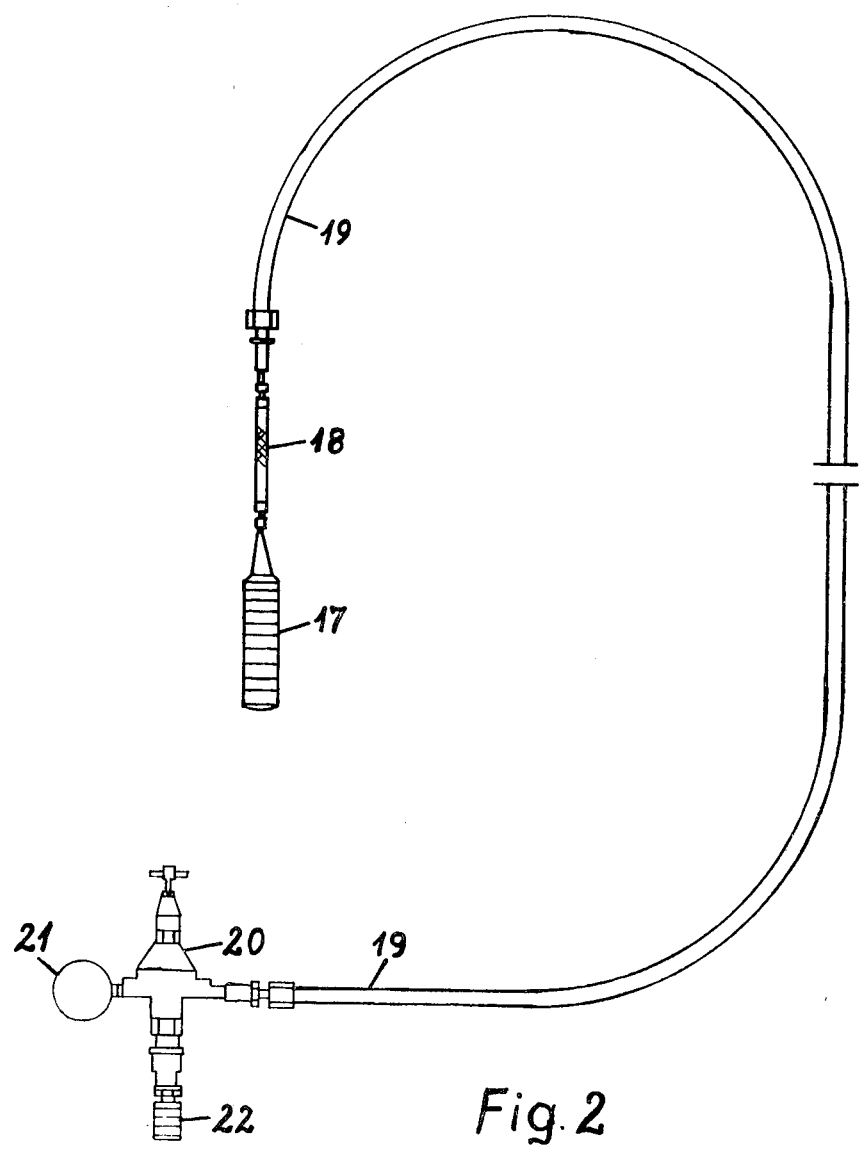
FIG. 2 shows a device for closing the domestic connection pipe with the hose being broken away.

The device as illustrated in FIG. 2 comprises essentially an inflatable cylindrical bladder 17, preferably made of rubber, having a connection piece 18 and a pressure line 19 connected thereto, preferably a flexible hose, and on the other end of which there are arranged a pressure reducer or reduction valve 20 with a manometer 21. The pressure reducer 20 has a connection 22 for a pressure source, for example a compressed air cylinder, a compressor or the like.

Figure 3:
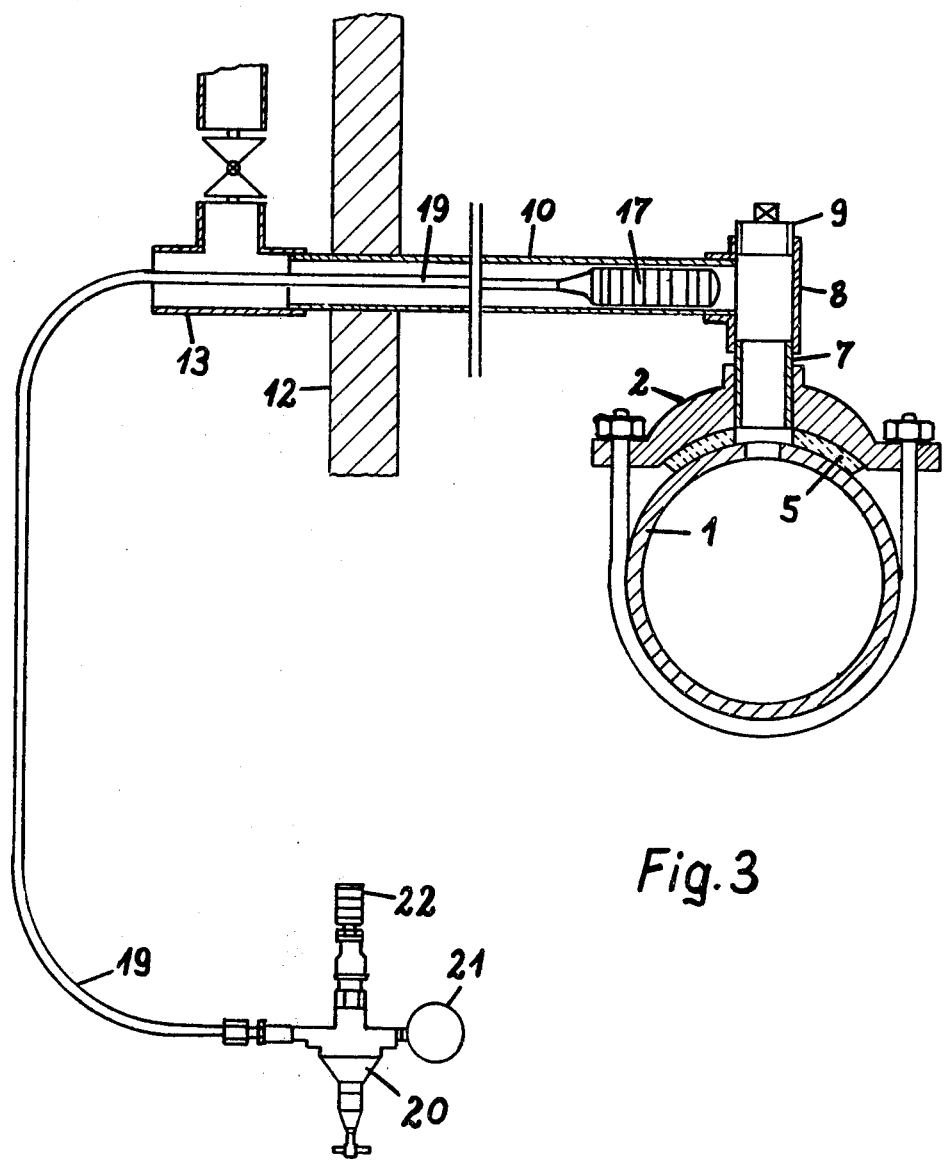
FIG. 3 shows the arrangement according to FIG. 1 with the device according to FIG. 2 introduced and with the domestic connection pipe being broken away.

In FIG. 3, for performing the method according to the invention the stopper 14 has been unscrewed from the cleaning T-piece 13. The bladder 17 with the attached pressure line 19 is introduced from the interior 12 of the house into the opened domestic connection pipe 10 into the region of the junction (opening) of the domestic connection pipe 10 with the main pipe 1. In the embodiment as illustrated the T-piece 8 forms this junction region. In further development of the invention the bladder 17 is first introduced so far into the domestic connection pipe 10 that it abuts on the junction 8, which in the embodient as illustrated is formed by the wall of the T-piece 8 lying in axial extension of the domestic connection pipe 10. Then the bladder 17 is retracted into the domestic connection pipe 10 again so far that in the manner as described below, during the lining of the main pipe 1, a plug of composition of predetermined size is formed in the T-piece 8, the volume of which plug is sufficient to produce the lining as described below in the junction 8.

The bladder 17 is now inflated through the pressure line 19. The length of the cylindrical bladder, which is preferably provided with sealing rings of rib form on its circumference, and the pressure which can be set on the pressure-reducer 20 and monitored on the manometer 21 are so selected that the pressure of the plastic composition acting in the axial direction upon the bladder 17 is not capable of displacing the bladder 17 in the pipe 10. In this way the domestic connection pipe 10 is closed tightly and in a pressure-tight manner by means of the bladder 17 in the region of its junction 8.

Figure 4:
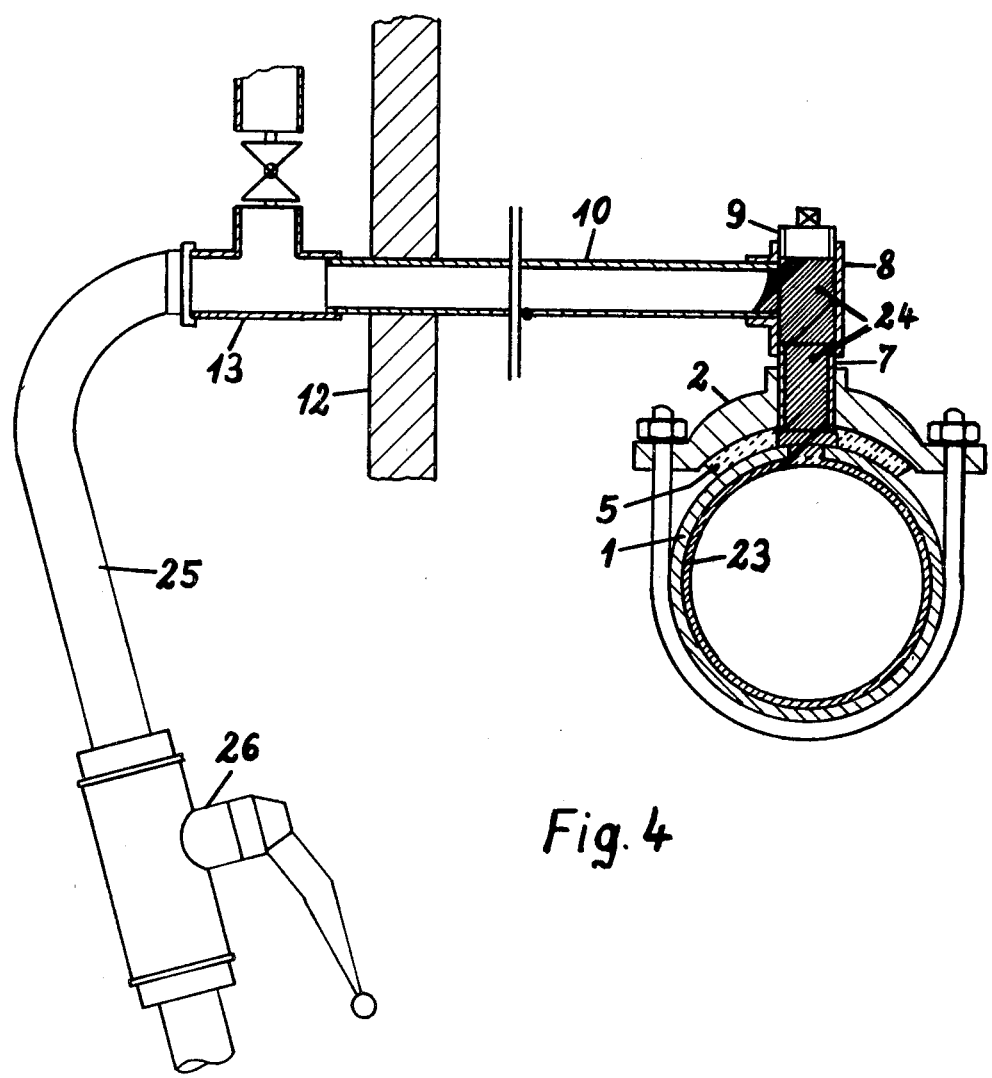
FIG. 4 shows the arrangement according to FIG. 1 after the lining of the main pipe and with the domestic connection pipe being broken away.

Then the main pipe 1 is spread with the plastic composition in the above-described manner and the internal coating 23 of is produced in the main pipe 1. In this operation a plug 24 of composition, the size of which is determined by the position of the bladder 17 in the domestic connection pipe 10 or its junction 8, is forced into the junction 8 of the domestic connection pipe 10. Then the pressure is relieved from the bladder 17 and the bladder with the pressure line 19 is withdrawn again from the domestic connection pipe 10 (FIG. 4).

Figure 5:
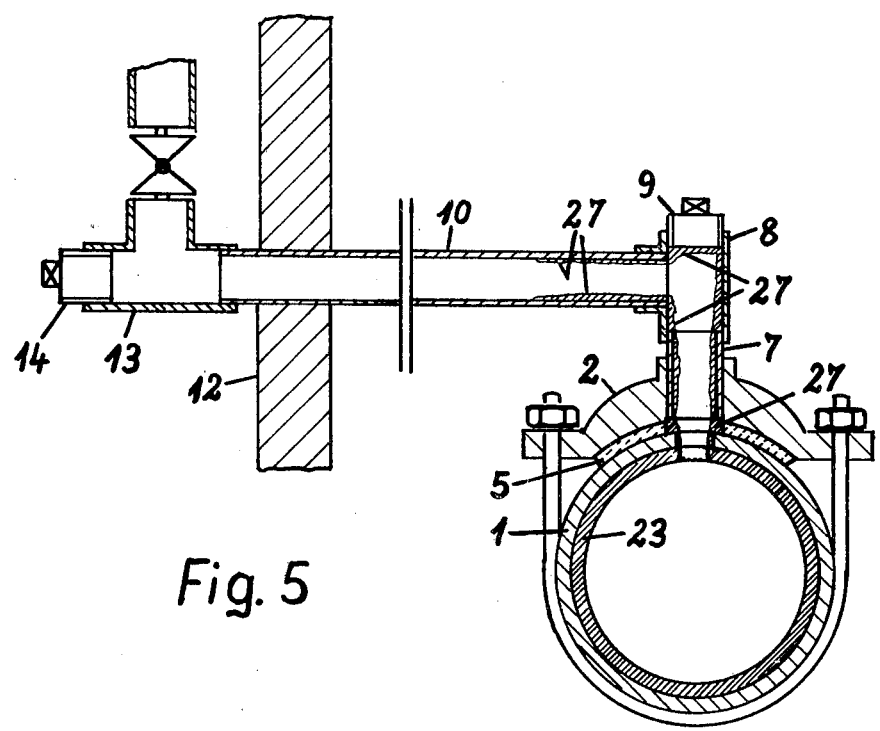
FIG. 5 shows the arrangement according to FIG. 1 in the finally lined condition and with the domestic connection pipe being broken away.

Before the plastic composition hardens, a sudden negative pressure is generated in the domestic connection pipe 10 from the interior 12 of the house. For this purpose in the embodiment as illustrated (FIG. 4), a suction line 25 with a ball cock 26 is connected to the clearing T-piece 13, which cock is connected with a suitable device (not shown) for the generation of a sufficiently great negative pressure with a sufficiently great volume, for example with a pump, a suction fan or the like, possibly with interposition of a vacuum tank. After an adequate negative pressure has been built-up by the device before the ball cock 26, by suddenly opening the ball cock 26, a sudden negative pressure is generated in the domestic connection pipe 10 of such a magnitude that the plug 24 of composition located in the junction 8 is sucked into the domestic connection pipe 10 and at the same time deformed into a lining 27 in the domestic connection pipe 10 in the region of its junction 8, this lining uninterruptedly continuously continuing the internal coating 23 of the main pipe 1 (FIG. 5).

This feature is based upon the recognition that in this operation the composition plug 24 is not sucked into the domestic connection pipe 10 while retaining its plug form, but the plastic composition, surprisingly, distributes itself uniformly over the inner walls of the junction 8 and the adjoining part of the domestic connection pipe 10 and deforms itself into a self-contained lining 27 which continuously gaplessly adjoins the internal coating 23 of the main pipe 1 and continues into the domestic connection pipe 10. In this way simultaneously with the lining of the main pipe 1, the opening in the gasket 5 and the threadings of the parts 2, 7, 8, 9 and 10 are coated and reliably sealed (FIG. 5).

In a further development of the invention the generation of the sudden negative pressure in the domestic connection pipe 10 is repeated once or if necessary even several times. It has been found that the coating in the domestic connection pipe 10 and in its junction 8 becomes thinner and longer, the more often and the longer the suction is applied. According to the size of the composition plug 24, the coating 27 can be drawn, for example, about two meters into the domestic connection pipe 10. In conclusion the domestic connection pipe 10 is re-closed by screwing the stopper 14 into the cleaning T-piece 13, so that it is again ready for operation.

The method according to the invention not only makes it possible, with the simplest conceivable means and minimum expense for labor and costs in the internal coating of the main pipe 1, to prevent blockage of the domestic connection pipe 10, without it being necessary to open up the street and excavate a trench with great expenditure of labor and costs, in order to expose the junction 8 and separate it from the main pipe 1. Rather the advantage is additionally also obtained that simultaneously, the critical parts in the region of the junction 8 which tend to leak are lined and reliably sealed. If the composition plug 24 were pushed back or blown out into the main pipe 1 by mechanical means, or for example, with compressed air, the lumps hardening in the main pipe would constrict the flow cross-section and nullify the flow-favorable smooth lining of the main pipe, and furthermore the gas stream striking on the wall of the main pipe during the blowing out would damage the as yet unhardened lining. These disadvantages also are avoided in the method according to the invention.

While I have disclosed one embodiment of the invention, it is to be understood that this embodiment is given by example only and not in a limiting sense.

I claim:

1. A method for lining main pipes, to which branching domestic connection pipes are connected, with an internal coating of a hardening plastic composition with which the main pipe is spread, comprising the steps of introducing from a house interior an inflatable bladder with a connected pressure line into an opened domestic connection pipe into a region of its junction with the main pipe, inflating the bladder through the connected pressure line and closing the domestic connection pipe tightly and in pressure-tight manner by means of the bladder in the region of said junction with the main pipe, spreading the main pipe with plastic composition to form an internal coating therein, a composition plug, being determined in size by the position of the bladder, being forced into the junction of the domestic connection pipe, then removing the pressure from the bladder and withdrawing the bladder with the pressure line again from the domestic connection pipe, and before hardening of the plastic composition generating in the domestic connection pipe a sudden negative pressure from the house interior of such magnitude that the composition plug located in the junction is sucked into the domestic connection pipe and deformed into a lining in the domestic connection pipe in the region of said junction which lining uninterruptedly continues the internal coating of the main pipe.

2. The method for lining main pipes according to claim 1, further wherein:

the bladder is introduced into the domestic connection pipe in said introduction step until the bladder abuts on said junction with the main pipe, and then withdrawing said bladder so far into the domestic connection pipe that the subsequently formed composition plug of a predetermined size is formed in the junction.

3. The method for lining main pipes according to claim 1 or 2, further comprising:

repeating the step of generating the sudden negative pressure in the domestic connection pipe.

* * * * *